Dec. 13, 1960 R. W. JOHNSON, JR., ET AL 2,964,039
PREFORMED, ARCUATE SANITARY NAPKINS
Filed Jan. 18, 1955 4 Sheets-Sheet 1
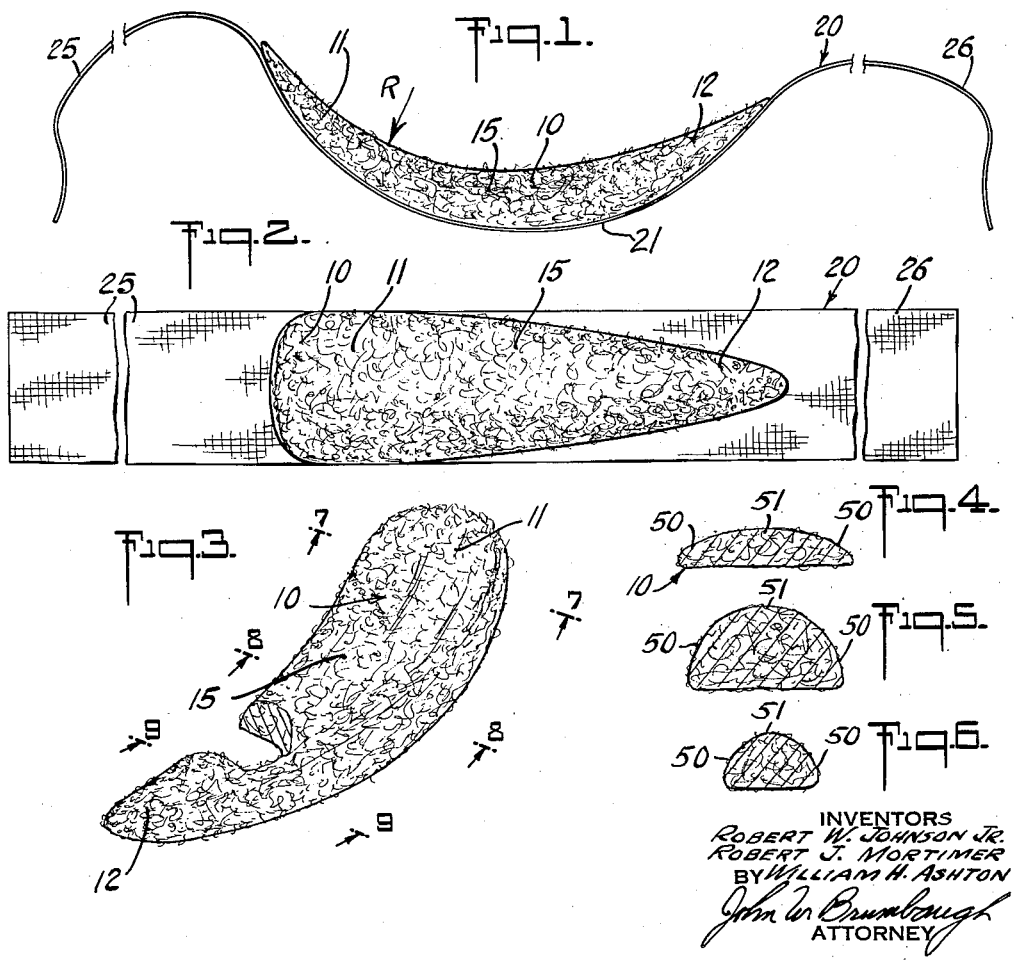
INVENTORS
ROBERT W. JOHNSON JR.
ROBERT J. MORTIMER
BY WILLIAM H. ASHTON
ATTORNEY

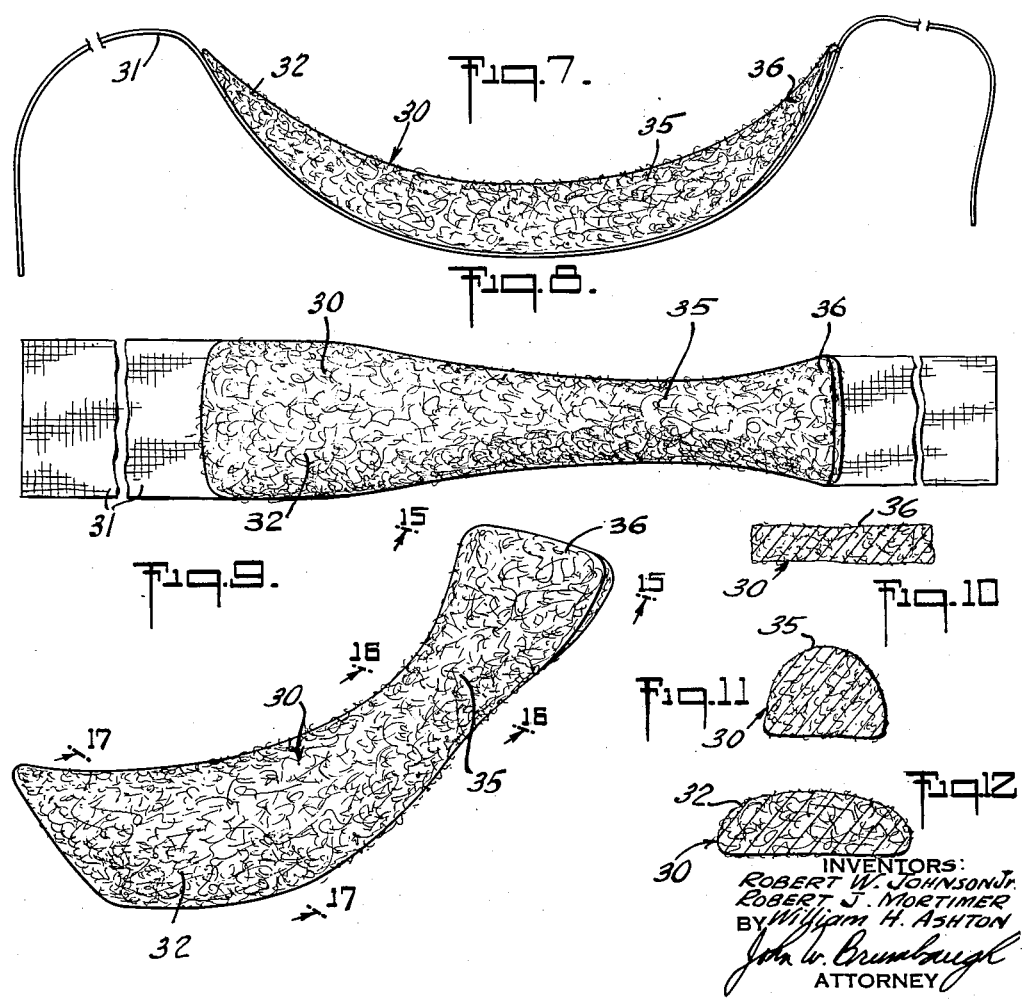

INVENTORS:
Robert W. Johnson Jr
Robert J. Mortimer
BY William H. Ashton
John W. Brumbaugh
ATTORNEY Dec. 13, 1960   R. W. JOHNSON, JR., ET AL   2,964,039
PREFORMED, ARCUATE SANITARY NAPKINS
Filed Jan. 18, 1955   4 Sheets-Sheet 4

INVENTORS:
Robert W. Johnson Jr.
Robert J. Mortimer
BY William H. Ashton
John W. Brumbaugh
ATTORNEY United States Patent Office 2,964,039
Patented Dec. 13, 1960

2,964,039

PREFORMED, ARCUATE SANITARY NAPKINS

Robert W. Johnson, Jr., Princeton, and Robert J. Mortimer, Bound Brook, N.J., and William H. Ashton, Philadelphia, Pa., assignors to Personal Products Corporation, a corporation of New Jersey Filed Jan. 18, 1955, Ser. No. 482,482

19 Claims. (Cl. 128—290)

This invention relates to an improved sanitary napkin.

Conventional sanitary napkins are characterized by having the shape of a rectangular parallelepipedon and an enclosing cover of gauze or other permeable material which is elongated at both ends of the napkin to provide tabs intended to be secured to sanitary belt clasps at the front and rear of the wearer. Since such napkins are normally flat, in use they become bent transversely into a curved shape to conform to the contours of the female pubic area. Since the napkin is wider than the space between the legs, particularly the region rearward of the vulva between the buttocks, in use the napkin has acquired a longitudinal fold with edge portions extending downwardly to fit into these narrower regions. For example, a typical pad may have flat dimensions of ¾" x 2¾" x 7½", but in actual use an attempt is made to force the flat pad to conform to the curvature of the area, the least radius of longitudinal curvature of which approximates 3½". In so bending the flat pad to fit the pubic area, the disparity between internal and external radii causes a longitudinal compression in the napkin adjacent the wearer, thereby producing ridges and flutes on the surface contiguous to the body. These ridges and flutes, which generally occur just forward of the downwardly folded posterior section, prevent intimate contact between the napkin and the wearer at the vulva where a snug fit is most requisite. Further, tension on the tabs necessary to maintain the folded shape produces discomfort and irritation.

It is in this way that problems relating to comfort, absorbency, control of fluid, shifting and chafing arise. Several manufacturers have approached the solution to the above problems by fabricating napkins from very soft pillowy formulations such as macerated pulp, cotton or absorbent tissue combinations. A considerable amount of work on conventional napkins has been directed toward improving absorbency rate and regulating direction of flow of fluid, simultaneously hoping to minimize chafing. However, there has been no prior teaching of ways of avoiding the disadvantages of conventional napkins arising from the shape of the napkin itself.

Another problem less generally appreciated is irritation due to the tabs of the napkin. Tabs are normally elongations of the sheathing of the pad and may be gauze, nonwoven fabric, or a combination of the two. When the flat tabs are clipped or gathered together for pinning to the support belts, vertical folding and fluting results, both anterior and posterior, accentuating discomfort.

Objects and advantages of the invention include provision of a sanitary napkin having shape such that it does not have to be deformed to be applied and worn in the female pubic area, i.e. in the region just forward of the labia majora to a point adjacent the anus.

A further advantage and object is provision of a napkin which in use avoids formation of ridges and flutes both lengthwise and crosswise of the napkin.

Another object and advantage resides in a napkin which has maximum capacity for absorption of fluid in its central portion adjacent the vulva.

A further object is provision of a sanitary napkin which has markedly greater comfort for the wearer.

Some prior art napkins have a repellent layer near the middle and therefore may be used with either side adjacent the wearer. An object of the invention is to design a napkin to permit use of only one side contiguous to the body and thereby reduce or avoid problems which may arise from such dual type structure.

The sanitary napkin of the invention comprises an absorbent structurally stabilized product which has preformed curvature to conform to and cover the exterior female pubic area between a point just forward of the labia majora to a point adjacent the anus, and is tapered from a relatively greater width at the forward portion to a substantially smaller width at the anal portion. By "structurally stabilized" it is meant that the product resists distortion from externally applied forces, and tends to return to the shape aforesaid when such external forces are removed.

The sanitary napkin of the present invention may be more fully understood by consideration of the appended drawings together with the following description.

Fig. 1 is a side view of the napkin with a suitable carrier strip affixed thereto.

Fig. 2 is a view of the Fig. 1 napkin as seen from above.

Fig. 3 is an isometric view of the Fig. 2 napkin apart from the carrier strip.

Figs. 4, 5 and 6 are sectional views through the napkin taken on planes 7, 8 and 9, respectively, of Fig. 3.

Fig. 7 is a side view of a napkin with securing tabs attached.

Fig. 8 is a top view of the napkin of Fig. 7.

Fig. 9 is an isometric view of the napkin illustrated in Figs. 7 to 12, inclusive.

Figs. 10, 11 and 12 are sectional views taken on planes 15, 16 and 17, respectively, of Fig. 9.

Figure 13:
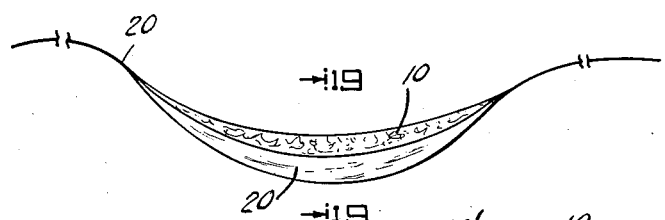

Fig. 13 illustrates the invention napkin with a modified type of carrier strip.

Figure 14:
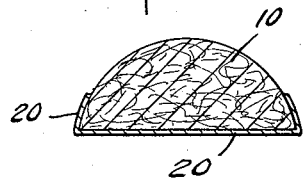

Fig. 14 is a sectional view taken on plane 19—19 of Fig. 13.

Figure 15:
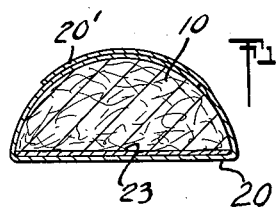

Fig. 15 is a lateral sectional view of a particular type of invention napkin.

Figure 16:
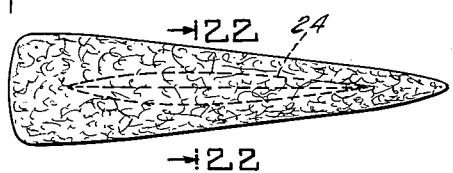

Fig. 16 is a plan view of another type napkin.

Figure 17:
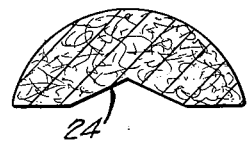

Fig. 17 is a sectional view taken on plane 22—22 of Fig. 16.

Figure 18:
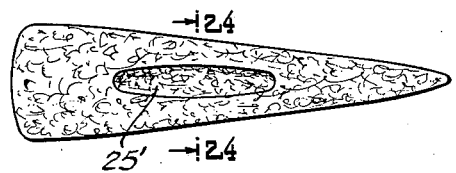

Fig. 18 is a plan view of still another napkin according to the invention.

Figure 19:
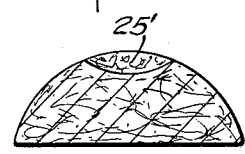

Fig. 19 is a sectional view taken on plane 24—24 of Fig. 18.

Figure 20:
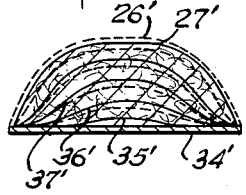

Fig. 20 is a transverse sectional view of the napkin according to another embodiment of the invention.

Figure 21:
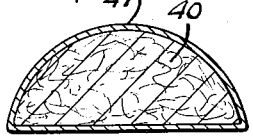

Fig. 21 is a transverse sectional view of the napkin according to still another embodiment of the invention.

Figure 22:
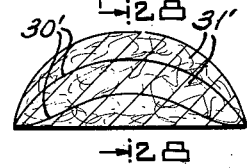

Fig. 22 is a transverse section through a laminated type napkin of the invention.

Figure 23:
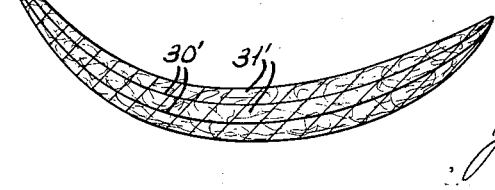

Fig. 23 is a longitudinal section taken on plane 28—28 of Fig. 22.

Figure 24:
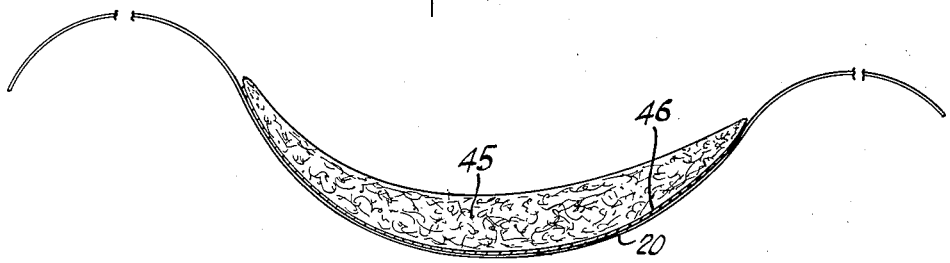

Fig. 24 is a longitudinal side view of another type napkin according to the invention.

Figure 25:
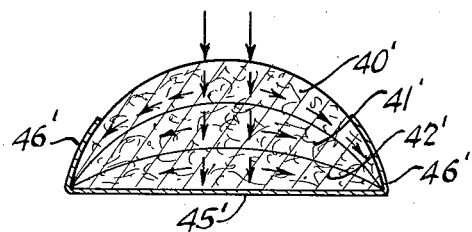

Fig. 25 is a transverse cross-sectional view of a napkin showing fluid flow patterns.

Figure 26:
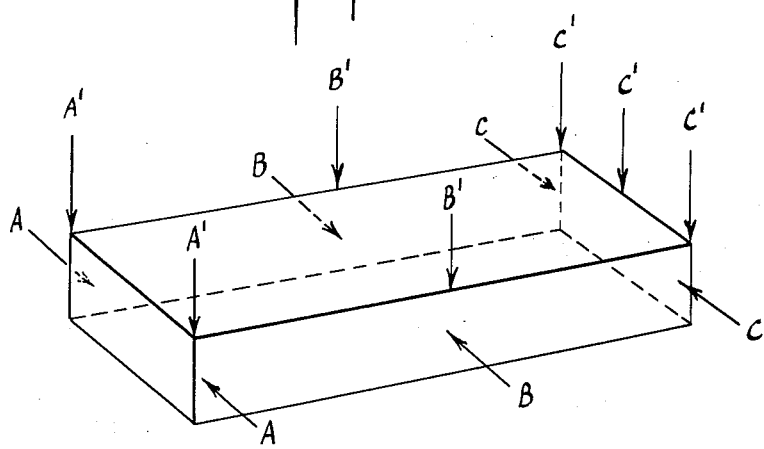

Fig. 26 illustrates certain aspects of the dynamics in formation of the invention napkin.

Reference is first made to the wedge-shaped napkin and, in particular, Figs. 1, 2 and 3. The napkin itself is shown at 10, having a relatively broad forward end 11 shown in section in Fig. 4, and a substantially narrower rearward end 12, shown in section in Fig. 6, the latter being designed to fit in the crease between the buttocks and over the anus with maximum comfort and security and without folding, shifting or chafing. The intermediate portion 15 of the napkin shown in section in Fig. 5 has maximum thickness and, therefore, high absorptive capacity in the region where most needed, that is, directly below the vulva. The amount of absorbent material in the napkin is sufficient to afford desired absorbent capacity and structural stability consistent with softness and comfort to the wearer. Generally, these requirements may be fulfilled within the range 5½–15 grams, preferably about 9–13 grams.

A notable feature of the invention has to do with the radius of curvature "R" of the inward side of the napkin. The napkin is formed as will be described hereinafter so that radius R conforms substantially to the average female pubic zone, i.e. radius R is substantially equal to or slightly less than the average radius of curvature of the area in question. In this respect particularly, the present invention possesses advantages over prior art napkins in that bending or folding of the napkin is not necessary to produce conformity. Formation of folds or flutes, particularly in the transverse direction, is thereby eliminated.

Especially when the radius R is slightly less than the curvature of the area, the napkin tends to clasp the body and maintain its position against the body with minimum upward endwise pull from carrier strips or securing tabs. The disadvantages of discomfort, etc., described above, caused by folding of and tension on the tabs are thereby substantially minimized, if not entirely eliminated.

The constitution of the invention fibrous napkin, described more fully hereinafter, is such that the napkin retains its own shape and resists distortion from externally applied forces. Due to this coherency characteristic, the napkin, if deformed, will return to the shape shown and described above when such external forces are removed. The property in question is described herein as "structural stability."

Backing or carrier strip 20 may be of any material found satisfactory for use in conventional sanitary napkins, e.g. gauze or nonwoven fabric. The napkin is secured to strip 20 by an adhesive seal or a bond 21 which preferably extends the entire length of the napkin. Tabs 25 and 26, which are formed by extensions of strip 20 beyond each end of the napkin, are provided for pinning or clipping to the conventional sanitary belt.

In a modified construction illustrated in Figs. 13 and 14 the carrier strip 20 may be folded upward around the edgewise portions of the napkin so as to cover a substantial portion thereof. Adhesive or other type bond may also be employed to secure such folded portions to the edges of the napkin. The relative position of the napkin and the edgewise folded carrier are shown in Fig. 14. If desired, strip 20 may extend completely around the napkin, and further may overlap at the bottom or top of the napkin to enclose it, as shown at 20' in Fig. 15 in which case the napkin core 10 may be held in carrier strip 20 by the fold without any positive bond, e.g. adhesive, between the core and carrier strip.

Certain additional advantages of the invention product will be realized by providing a carrier strip 20 (Fig. 15) having water-repellent properties (except on the top surface of the napkin), thereby preventing strike-through of fluid, and increasing the usable capacity of the napkin and the feeling of security in the wearer. A water-repellent sheet 23, preferably extending the length of core 10, may be inserted between the core and core cover 20 with similar advantageous effect.

Specific types of napkin cores are described in Figs. 16 to 19, inclusive. The Fig. 16 core, which has the curved structurally stabilized form of the core shown in Fig. 1 is provided with a longitudinal groove 24 molded into the lower side. This feature provides additional sidewise resiliency, simultaneously assisting the stabilization of structure of the napkin. Molded groove 24 is shown in cross section in Fig. 17.

The napkin core described in Fig. 18 also has tapered and arcuate structurally stabilized form and is provided further with a recess 25', preferably formed during the molding operation. Recess 25' is disposed on the top surface of the napkin adjacent the wearer and is intended to accommodate protruding portions of the vulva, thereby to provide maximum comfort to the wearer and minimize chafing.

The modified napkin illustrated in Figs. 7 to 12, inclusive, has an absorbent element 30. This napkin has a relatively wide forward portion 32, shown in section in Fig. 12, and a substantially narrower anal portion 35, shown in section in Fig. 11. Just as in the case of the napkins described in Figs. 1 to 6, inclusive, the modified napkin has pre-formed and structurally stabilized curvature to fit the wearer, thereby affording all the advantages aforesaid. The characteristic feature of the modified napkin, as distinguished from the wedge type, is the rearward wide portion 36. It will be noted that section 36, illustrated in Fig. 10, is substantially thinner than the rest of the napkin. The increased width is a safeguard against forward shifting of the napkin which, in some women, is a problem, while the decreased thickness in this area provides minimum bulk so as to avoid discomfort in the sitting position. The carrier strip of the modified napkin may be folded and adhesively secured to the napkin edges, just as shown in Figs. 13 and 14 for the wedge type napkin, or overlapped as shown at 20' of Fig. 15.

The invention napkin is constituted of absorbent material so formed that the napkin is structurally stabilized. There are a number of ways of accomplishing the desired object of structural stability. One type of napkin which has been prepared, tested and found successful is constituted of a mixture of heat or solvent-activatable fibers and non-activatable fibers. As a first step in preparing this type, the activatable and non-activatable fibers may be homogeneously blended in a standard fiber blending machine. Satisfactory non-activatable fibers may be selected from the group wood pulp, cotton (linters or longer staple), rayon, absorbent tissue in paper form or any of the fibrous residues from sugar cane, kapok, jute, ramie, or any heterogeneous mixture of rag waste, or any combinations of the groups. Superior mechanical strength, particularly wet strength, is obtainable by mixing into one of the very short fibers, such as wood pulp or cotton linters, one of the longer fibers, such as cotton, usually in small proportion to make the product economical.

One group of activatable fibers of particular utility is composed of fibers which fuse or tackify when heat is applied or when treated with solvents, or when the two treatments are combined. Examples of materials in this group are polyvinyl chloride, copolymers of vinyl chloride-vinyl acetate, cellulose ethers or esters such as cellulose acetate, or other thermoplastic or solvent-activatable fibers. In employing the activatable fibers a plasticizer is generally incorporated therein to supplement and facilitate the action of the heat and/or solvent in producing desired change in properties when heated or solvent-treated. Cellulose acetate having degree of substitution of from 2.2 to 3.0, suitably 2.5 (acetyl groups per glucose unit) in staple form, 3 denier, 1¼ inches long, is satisfactory. Desirable plasticizers for cellulose acetate include dimethyl phthalate, mixtures of ortho and para-N-ethyl-toluene sulfonamide, and methyl-phthalyl-ethyl glycolate. Plasticizer content may be from 10 to 40% or of sufficient magnitude to tackify the fibers under activating conditions. Using the foregoing plasticizer in amounts indicated, activation may be realized by heating to a temperature of about 140 to 330° F.

Plasticizers which are volatile, and thereby removed by application of heat and/or steam incorporated into the activatable fibers, produce a product which, after formation, is no longer susceptible to change in shape by reapplication of the forming conditions. For example, cellulose acetate plasticized with dimethyl phthalate or methyl-ethyl ketone is notably useful in this respect.

The activatable materials may be those which are sensitive to heat, but it is not necessary that they be of the type that fuses or tackifies when heat is applied. They can be of the type which shrinks when heated. In this category may be found the polyamides, polyesters, polyacrylates, and heat-settable vinyl polymer fibers.

Another source of fibers is available by coating non-activatable fibers such as wood pulp with a solution or emulsion of a thermoplastic or a thermosetting resin which may be any of those described above, and removing the liquid dispersing medium. Napkins molded from the fiber just described may consist entirely thereof. If desired, the resin treated fiber may be mixed with a small proportion of non-resin treated fiber of textile length to improve mechanical strength. Activatable fibers may be mixed with the resin treated fibers either with or without such textile fibers.

The method of formation of the napkin involves generally the steps of preparing a web or batting of the desired fiber composition, activating the activatable element therein while the product is in the napkin shape described above, e.g. by application of heat and/or steam, and thereafter removing the napkin from the forming conditions. Where a blend or mixture of activatable and non-activatable fibers is provided throughout the thickness of the napkin, the napkin may be molded or formed under conditions which activate the fibers throughout the thickness of the napkin rather than just on the surface, or the napkin may be treated under conditions to activate the fibers primarily only at or near the surface, or the fibers may be activated primarily only on the bottom, i.e. convex, surface, depending upon particular types and arrangement of the fibers and the qualities desired to be accentuated as described herein.

A primary object and advantage of the invention napkin resides in a product which has structural stability in the shape heretofore described. This structural stability may be imparted to the product in a variety of ways other than by blending activatable and non-activatable fibers, and then subjecting the product to activating conditions. For example, instead of utilizing a homogeneous mixture of the two types of fibers, the fibers may be laid down in individual thin webs, alternating thin webs of activatable fiber and non-activatable fiber. Such a napkin is illustrated in Fig. 20 wherein the laminae of non-activatable fibers are shown in dash lines 26' and the laminae of activatable fibers are indicated by solid lines 27'. The laminae, of course, extend longitudinally through the napkin. An added advantage of this laminated product is that surface softness is obtained from the non-activatable fibers, such as cotton linters or wood pulp, while the activated fibers, which remain distributed throughout the thickness of the pad, preserve structural stability.

In another embodiment of the invention, a napkin is formed of non-activatable fibers, which may be of any of the types described above, structurally stabilized with a suitable resin which is activatable with heat and/or solvent. The resin, as in the case of the activatable fibers described above, may be interspersed throughout the thickness of the napkin in proportions given below for fibers, and activated as aforesaid by heat and/or solvent.

In order to produce desired mechanical strength of the napkin and ability to retain structural stability, the proportion of activatable fiber in the napkin bonded throughout its thickness may advantageously be greater than about 5%, although smaller amounts may be effective especially when used in conjunction with bonding resin. For the heat-tackifying fibers, such as cellulose acetate and vinyl ester polymers, preferably a concentration of at least about 8% by weight is maintained. Inasmuch as activatable fibers will generally be more costly, an excesive amount thereof, for reasons of economy, will usually be avoided. Above about 25% of activatable fibers, the advantages of incremental increase in strength with activatable fiber percentage will diminish, and, accordingly, preferred composition is not greater than about 25% activatable fibers.

Another embodiment of the invention comprises a sanitary napkin formed of non-activatable fibers surrounded by a relatively thin sheet or veneer comprising activatable fibers. Such a napkin is described in section in Fig. 21 wherein the non-activatable center 40 is surrounded by a veneer 41 comprising a moldable proportion of activatable fibers. The function of the veneer 41 is to maintain and preserve the structural stability of the product. Veneer 41 may be a card web of activatable fibers or a nonwoven fabric comprising activatable fibers, in each case formed as by folding around the non-activatable center and thereafter subjecting the composite product to activating conditions, as described above, thereby to produce the conforming napkin shape.

Still another embodiment of the invention is directed to a sanitary napkin similar to that just described except that the non-activatable fiber center 40 is surrounded by a relatively thin shell 41 of fibers treated with an activatable resin. The function of the resin, smilar to the case of the activatable fiber veneer, is to structurally stabilize the conforming shape of the invention napkin. The napkin in question may be prepared by dieing out a blank of suitable shape of non-activatable fibers, spraying the outside of the blank with a solution of bonding resin and then forming the blank to desired shape under conditions which activate the resin, e.g. molding with heat and pressure. The amount of activatable fiber or resin in the shell 41 is sufficient to maintain structural stability, preferably 1% to 8% on total weight of core, and preferably at least 10% based on the weight of the veneer.

Suitable types of resins or other bonding agents for use in preparing the desired sanitary napkins, particularly those just described containing a thin external shell of the resin, are cold water-insoluble polyvinyl alcohols and other vinyl polymers, sodium carboxymethyl celluloses, ethyl and methyl celluloses and other cellulose ethers, cellulose acetate and other cellulose esters, polyacrylic acid, polyacrylic acid esters, starches, synthetic rubber solutions and lattices, and vegetable gums. Of the polyvinyl alcohols, one type having a viscosity of 45 to 55 centipoises as determined by the Hoeppler falling ball method (determined in a 4% aqueous solution at 20° C.), 98 to 100% hydrolyzed (from vinyl acetate) and having a pH of from 6 to 8, may be used as a bonding agent in the present invention. Another suitable type is that sold by the same manufacturer having viscosities of 35 to 45 by the Hoeppler method, 86 to 89% hydrolyzed, and having a pH in the range of 6 to 8.

In Figs. 22 and 23 there is shown a sanitary napkin which is structurally stabilized by internal thin zones 30' of relatively rigid plastic material which are disposed adjacent a medial curved plane passing through the napkin. Such a product may be produced by dispersing non-activatable fibers (pulp or cotton linters) according to procedure described below to make a soft light-weight relatively uncompressed "snake." One surface, for example the top surface, of this snake is then sprayed with a dispersion of bonding agent, e.g. resin such as polyvinyl chloride or vinyl chloride-acetate, suitably to the extent of about 1 to 5% dry resin weight based on the fibers. Before the resin is completely dried, another web is superposed on the sprayed surface and one or more of such sprayed webs may be placed below (sprayed side up) in stacked relationship. The composite material may be sprayed on its top and bottom surfaces, cut into individual napkin core units, and molded as described hereinafter to produce the form shown in Figs. 22 and 23. The final spraying operation binds the surface fibers, but the amount of resin applied is such as to maintain softness of the product and resulting comfort for the wearer. Hence, the properties of absorbency and softness are imparted by the pulp or linters layers 31', while the intermediate resin layers 30' reinforce the product from the standpoint of structural stability.

According to a modification of the napkin illustrated in Figs. 22 and 23, the original non-activatable fiber sheet may be sprayed with a solution of a bonding agent, e.g. a resin such as polyvinyl chloride or vinyl chloride-acetate, or cellulose acetate, thereby to add about 20% resin based on the fiber weight. The sprayed material is disintegrated. The surface of the resultant light-weight dispersed uncompressed web then is sprayed to produce reinforcing layers 30', and two or more webs are superposed as described in the preceding paragraph. The thick uncompressed composite product then is cut and molded. Spraying prior to dispersing and employed as a substitute for or an adjunct to surface-spraying of the composite material are both measures of obtaining cohesion of the napkin in this modification. Accordingly, one of such measures may be eliminated, if desired, or both utilized as described.

The intermediate layers 30' shown in Figs. 22 and 23 and described in the preceding paragraphs as being formed by spraying, may be formed of parallel monofilaments of bonding agent, suitable resin; or fabric etc., laid in between the webs prior to molding.

Still another embodiment of the invention is illustrated in Fig. 24 wherein there is shown a fibrous absorbent napkin 45 which may be formed of non-activatable fibers and may be identical in shape with either the type illustrated in Figs. 1 to 6, inclusive, or in Figs. 7 to 12, inclusive. The distinguishing feature of napkin 45 is that it is provided with a relatively rigid backing member 46. The function of backing 46 is to preserve and structurally stabilize the conforming shape and radius of napkin 45. Backing 46 is preferably co-extensive with the under-surface of napkin 10 or 35 and does not project laterally beyond the edges of the napkin in the interest of avoiding chafing. Backing 46 may be any sheet material having the required stability such as regenerated cellulose, vinyl plastic, etc. It is secured to napkin 45, preferably by adhesive, and is preferably waterproof. One method of manufacturing the product illustrated in Fig. 24 is to form the non-activatable fibers in a suitable convex mold, apply backing 46, suitably coated with pressure-sensitive adhesive, to the exposed surface of the molded fibers (which is the undersurface of the napkin), and then remove the backing and napkin from the mold.

The sanitary napkin shown in Fig. 20 which is heretofore described as formed of alternating superposed layers of non-activatable fibers 26' and activatable fibers 27' may have a modified structure so as to provide the major attributes of a relatively rigid-backed sanitary napkin described in the preceding paragraph. Starting at the bottom or convex surface of the napkin and moving inwardly from carrier 34', each succeeding layer of activatable fibers 35', 36', 37', etc., is activatable at an appreciably higher temperature. Accordingly, when the napkin is subjected to molding and activating conditions, the layers nearest carrier 34' are the most rigid, while those nearer the top surface, such as 27', are softer and more resilient. Since the top surface is adjacent the body, greater softness and comfort are thereby provided. A similar over-all result will be produced by employing layers of activatable fibers 34', 35', etc., having the same softening temperature and applying heat only at the bottom surface. Since the heat requires an appreciable time to penetrate the fibrous mass, the layers of activatable fibers nearest the bottom surface will be the most highly activatable and rigid, while those near the top surface will be the least activated and, therefore, the softest. It will be apparent that the technique of application of the major amount of heat at the bottom surface only of the napkin may be utilized in manufacture of other type napkins disclosed above, e.g. those formed of a homogeneous mixture of activatable and non-activatable fibers. Spraying the top surface of the napkin with a bonding agent in any case may be desirable to increase cohesion of the surface fibers.

A sanitary napkin formed of a plurality of layers 40', 41' and 42' of fibers and which may be prepared according to the procedure outlined in discussion of Figs. 22 and 23 is shown in lateral cross section in Fig. 25. It has a carrier strip 45' which is folded around so as to cover substantially side areas 46' of the napkin. Carrier 45' is liquid-repellent. Layer 40', on the other hand, is very absorbent. Layer 41' is somewhat less absorbent than layer 40', while layer 42' is still less absorbent than layer 41'. This napkin is so formed as to make optimum use of the potential absorbent capacity available. Fluid entering the napkin at the points indicated by vertical arrows shown in Fig. 25 is rapidly absorbed and removed from the surface of the body by highly absorbent layer 40'. The fluid quickly contacts secondary layer 41' and soon is absorbed therein. In each of layers 40' and 41' there will be spreading of fluid toward the edges of the napkin, thereby efficiently utilizing the available absorbent capacity. Finally, the fluid will enter and spread toward the edges in layer 42'. By this time the edgewise spreading of fluid in layer 40' has advanced substantially. However, leakage of fluid outwardly through the sides 46' is prevented by the highly liquid-repellent character of the backing strip 45'.

To produce the graduated water absorbency of the various layers 40', 41', and 42', just described, wetting agents or water-repellent agents may be applied to the absorbent material therein. Suitable wetting agents include the following: alkylaryl polyether alcohols, sodium alkyl-naphthalene sulfonates, alkylaryl sulfonates, alkylene oxide condensates, sulfate esters of alkyl phenoxypolyoxyethylene ethanol, sodium alkylaryl sulfonates, sodium hydrocarbon sulfonates, acetylated hydroxy fatty acid amides, polyoxyethylene aliphatic alcohols, sulfated fatty esters, fatty esters of polyglycols, non-ionic fatty amide condensates, sulfonated aliphatic esters, sodium dioctyl sulfosuccinate, solubilized terpene derivatives, long chain alcohol sulfates, and alkylated aroyl ester sulfonates. Suitable water-repellents include the following: aluminum acetate, wax emulsions, wax emulsions plus aluminum salts, wax solutions in organic solvent, polymerized silicone resins, organo-silicone polymers, long chain pyridinium compounds, and wax-zirconium acetate emulsions.

Certain advantages of the invention product arise by molding a substantially rectangular parallelepipedon with pressure to desired shape described above. According to various procedures described hereinafter, a rectangular parallelepipedon, shown in Fig. 26, of fibrous material having substantially uniform density, is compressed laterally, particularly edgewise, as shown by arrows A and A', to a cross section shown in Fig. 6. On the other hand, compressive forces, notably lateral compressive forces, indicated by arrows B, and vertical edgewise forces B' of Fig. 26 are applied near the central portion of the napkin, resulting in a final form illustrated in Fig. 5. Finally, at the forward part of the napkin, horizontal lateral compressive forces C and vertical compressive forces C' are applied, thereby producing in this zone a cross section illustrated in Fig. 4. It will be apparent that the density of each cross section and each portion of each cross section will be dependent upon the degree of compression which has occurred at the place in question. For instance, at the rear portion of the napkin shown in Fig. 6 the density of the product will be substantially greater than in other portions of the napkin. The resulting structure, therefore, has substantially greater rigidity in the rear portion. Rigidity in this region is desirable in the interest of maintaining maximum product stability and avoidance of twisting and shifting. Further, edgewise portions 50, particularly in the central and forward parts of the napkin, due to compressive forces B' and C' will have greater density and rigidity than central portions 51. This is desirable in the interest of providing maximum softness in portions of the napkin in contact with the vulva. At the same time, the edgewise portions 50, where maximum softness is not critical, have greater density and rigidity, thereby further assuring structural stability of the napkin.

Within the broader concept of the invention, the napkin core need not be of fibrous material. For example, known resins such as polyvinyl chloride, polyesters and isocyanate resins, may be produced in sponge-like form, having a foraminous surface and interconnected small holes or voids throughout, which absorb and hold moisture. These materials may be molded in tapered arcuate shape, described above, having structural stability to conform to the female pubic area and thereby fulfill important objects of the invention.

Many variations and modifications are available for manufacture of the stabilized napkin of the present invention. It is intended to include within the scope of the appended claims all modifications and equivalents within the spirit of the invention.

The claims are:

1. A sanitary napkin comprising absorbent fibrous material, the inner surface of said napkin having a curved lengthwise configuration giving said napkin a preformed arcuate shape in the direction of its length to conform to and cover the exterior female pubic area from the region adjacent of the anus to forward of the labia majora without transverse creasing of said napkin, said arcuate shape being structurally stabilized by a flexible preformed arcuate portion extending lengthwise of the napkin, said arcuate portion being resistant to softening when wet and retaining the arcuate shape of said napkin in said lengthwise direction so that the napkin retains said shape without support.

2. A sanitary napkin according to claim 1, wherein said flexible preformed arcuate portion is parallel to the bottom convex surface of the napkin to maintain said arcuate shape and structural stability.

3. A napkin according to claim 1 formed of a core of absorbent fibers surrounded by a fibrous veneer containing a bonding agent bonding said veneer fibers to each other thereby to create and maintain said structural stability.

4. A sanitary napkin comprising absorbent fibrous material, said napkin having a preformed arcuate shape in the direction of its length to conform to and cover the exterior female pubic area from the region adjacent the anus to forward of the labia majora without transverse creasing of said napkin, the napkin having tabs secured thereto to be affixed to the wearer, said fibrous material containing a water insoluble bonding agent bonding fibers to each other, thereby to structurally stabilize said arcuate shape so that said napkin retains said shape even when wet without support and thereby minimizes tension on said tabs when said napkin is in position on the wearer.

5. A sanitary napkin according to claim 4 having at least one layer of said fibrous material being relatively rigid and substantially parallel to the bottom convex surface of the napkin and removed from the top concave surface thereof.

6. A sanitary napkin according to claim 5 in which said layer is formed of sprayed resin disposed adjacent a medial curved section passing through the napkin.

7. A napkin according to claim 6 in which at least a portion of said bonding agent is disposed on the surface of the napkin, thereby to secure the surface fibers in place.

8. A napkin according to claim 4 formed of thin laminae of alternating activatable and non-activatable fibers substantially parallel to the bottom convex surface of the napkin.

9. A napkin according to claim 4 formed of a plurality of layers of fibers, the layers having graded porosity with respect to each other, the top layer being absorbent and the bottom layer non-absorbent, and a non-absorbent backing sheet adjacent and covering said bottom layer, the edges of said backing sheet being folded around, secured to and covering substantial portions of the side edges of said napkin.

10. A napkin according to claim 4 having a non-absorbent backing sheet adjacent and covering its bottom convex surface, the edges of said backing sheet being folded around, secured to and covering substantial portions of the side edges of said napkin.

11. A napkin according to claim 4 in which the bonding agent is distributed substantially uniformly throughout said fibrous material and is present in amount at least 5% of the weight thereof.

12. A napkin according to claim 11 in which the bonding agent is an adhesive resin.

13. A napkin according to claim 11 in which the bonding agent is a thermoplastic fiber.

14. A napkin according to claim 11 comprising a major proportion of a short fiber of the group consisting of wood pulp and cotton linters.

15. A napkin according to claim 14 comprising a minor proportion of textile fiber homogeneously blended with said short fibers thereby to increase the wet strength and coherency of the napkin.

16. A napkin according to claim 11 having a waterproof backing sheet secured to the convex side of said napkin, extensions on opposite ends of said backing sheet providing said tabs.

17. A napkin according to claim 16 in which said backing sheet is folded around and secured to both side surfaces of the napkin, thereby to cover and protect a substantial portion of said side surfaces.

18. A napkin according to claim 11 being at its forward end relatively thin and dense as compared with its central portion and being at its anal portion relatively narrow and dense as compared with said central portion thereby to enhance structural stability and comfort.

19. A napkin according to claim 4 having cotton linters bonded over substantially entire concave surface thereof.

References Cited in the file of this patent

UNITED STATES PATENTS

| | | |
|---|---|---|
| 2,331,355 | Strongson | Oct. 12, 1943 |
| 2,408,508 | Canavan | Oct. 1, 1946 |
| 2,455,925 | Ganz | Dec. 14, 1948 |
| 2,468,876 | Hermanson | May 3, 1949 |
| 2,549,982 | McKhann et al. | Apr. 24, 1951 |
| 2,566,325 | Ganz | Sept. 4, 1951 |
| 2,566,451 | Julien | Sept. 4, 1951 |
| 2,773,503 | Brownlee et al. | Dec. 11, 1956 |

FOREIGN PATENTS

| | | |
|---|---|---|
| 352,805 | Great Britain | July 16, 1931 |